United States Patent [19]
Cone

[11] 3,778,651
[45] Dec. 11, 1973

[54] ELECTRICAL GENERATING DEVICE FOR USE WITH ENGINE CLUTCH MECHANISM

[76] Inventor: William H. Cone, 1151 Meadow Lane Apt. 3A, Waterloo, Iowa 50701

[22] Filed: June 19, 1972

[21] Appl. No.: 264,271

[52] U.S. Cl. .................................. 310/74, 310/78
[51] Int. Cl. ............................................. H02k 7/02
[58] Field of Search ................... 310/76, 68, 68 D, 310/74, 78, 70 B, 70 D, 153, 92, 100, 168, 263, 75, 70; 74/572

[56] References Cited
UNITED STATES PATENTS

| | | | |
|---|---|---|---|
| 3,652,883 | 3/1972 | Cone | 310/74 |
| 3,493,800 | 2/1970 | Barrett | 310/263 |
| 3,317,765 | 5/1967 | Cone | 310/74 |
| 3,476,962 | 11/1969 | Fauth | 310/76 |
| 3,600,616 | 7/1971 | Yokoyama | 310/76 |
| 3,589,485 | 6/1971 | Kajitani | 310/78 |
| 3,094,202 | 6/1963 | Issler | 310/92 |

Primary Examiner—R. Skudy
Attorney—Zarley, McKee & Thomte

[57] ABSTRACT

The present invention comprises an electrical generating device in combination with an engine clutch mechanism. The current generating device includes a rotor which is rigidly connected to a flywheel and is adapted to rotate therewith. A stator is mounted within the clutch housing and surrounds the rotor so that rotation of the rotor causes electrical current to be generated in the stator windings. Also mounted within the clutch housing is a clutch mechanism.

5 Claims, 4 Drawing Figures

PATENTED DEC 11 1973  3,778,651

ELECTRICAL GENERATING DEVICE FOR USE WITH ENGINE CLUTCH MECHANISM

The present invention relates to electrical generating devices and particularly to electrical generating devices for use with an engine clutch mechanism.

Most vehicles presently use generators or alternators which are belt-driven and which are mounted on the exterior of the vehicle engine. Because these generating devices are belt-driven, many problems develop as a result of the belt drives. Furthermore, these conventional generating devices consume much space and involve cumbersome mechanical components.

The present invention contemplates an improvement over conventional generating devices in that it provides a generating device which may be mounted within clutch housings of presently existing vehicles. The generating device is driven directly by the flywheel from the engine, and therefore eliminates the belt drives commonly used in conventional generators. This arrangement also eliminates the need for bearings and housings which are used in conventional generators. Instead the engine bearings and the clutch bell housing serve the functions of these components. Furthermore, the present device creates more electrical power at low engine speeds than previous devices.

Therefore, a primary object of the present invention is the provision of an electrical generating device which may be mounted within an engine clutch housing.

A further object of the present invention is the provision of a device which provides more electrical power at low engine speeds.

A further object of the present invention is the provision of a device which may be driven directly by the flywheel of an engine or which can be substituted for the flywheel of an engine.

A further object of the present invention is the provision of a generating device which will fit in an engine in any vehicle configuration.

A further object of the present invention is the provision of a generating device which does not require the battery to initially begin generating current.

A further object of the present invention is the provision of a generating device which may be mounted within a conventional engine clutch housing by inserting a stator in the clutch bell housing and replacing the clutch backing plate with an alternator rotor.

A further object of the present invention is the provision of a generating device which produces alternating current of constant frequency and magnitude during variation of the rotational velocity of the flywheel.

A further object of the present invention is the provision of a generating device which may be mounted within a clutch housing without interferring with the operation of the clutch mechanism.

A further object of the present invention is the provision of a device which is simple in construction, economical to manufacture, and dependable and durable in use.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
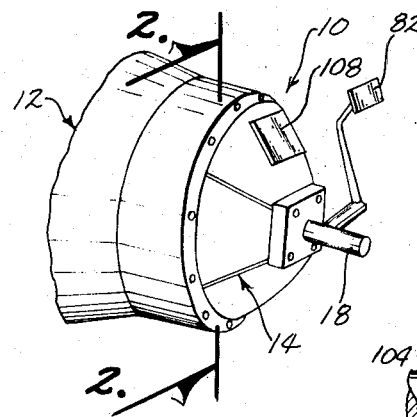
FIG. 1 is a perspective view of a conventional clutch housing mounted on an engine.

Referring to the drawings, a clutch assembly 10 is shown mounted to the rearward end of an engine 12. Clutch assembly 10 includes a clutch bell housing 14 which is conventional in structure. Extending from engine 12 is a crank shaft 16, and protruding rearwardly from clutch assembly 10 is a power output shaft 18 which is separate from and rotates independently of shaft 16 when the clutch to be described hereinafter is disengaged.

Rigidly mounted on the rearward end of crank shaft 16 in conventional manner is a flywheel 20 having a rearwardly presented frictional face 22. Flywheel 20 is provided with spaced bolt holes 24 which are shown in hidden lines in FIG. 2. Bolt holes 24 are normally used to bolt a clutch backing plate (not shown) to flywheel 20 but this backing plate has been replaced by the alternator rotor described hereinafter.

Figure 3:
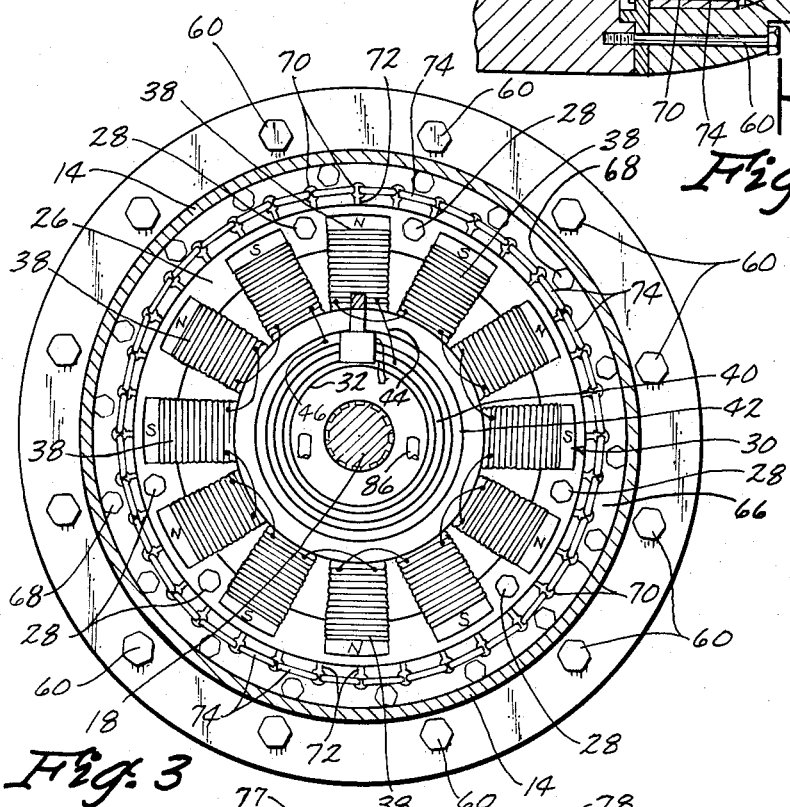
FIG. 3 is a sectional view taken along line 3—3 of FIG. 2.
Figure 4:
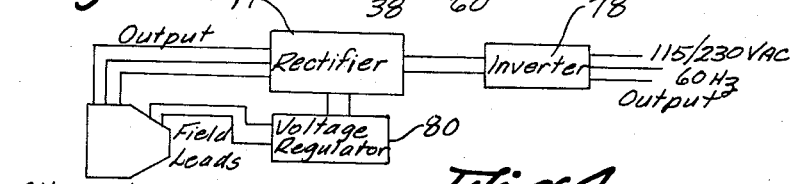
FIG. 4 is a block diagram of the electrical components used in conjunction with the alternator of the present invention.

Extending around the outer circumferential edge of the rear face of flywheel 20 is a ring 26 made of stainless steel or other non-magnetic material. As seen in FIG. 3, ring 26 includes bolt holes which are in alignment with bolt holes 24 of flywheel 20, and which are used to secure ring 26 to flywheel 20 by means of bolts 28.

Ring 26 is part of a rotor 30 having an inner annular collar 32, a plurality of radial poles 34 extending radially outwardly and axially forwardly from collar 32, and a plurality of pole faces 36 mounted on the extreme outer radial ends of poles 34. Pole faces 36 are welded to stainless steel ring 26 so as to rigidly secure rotor 30 to flywheel 20 for rotation in unison therewith.

In this regard, stainless steel ring 26 provides a barrier between flywheel 20 and rotor poles 34 so as to prevent magnetic lines of flux from passing from poles 34 to flywheel 20. Thus ring 26 reduces the tendency for magnetic lines of force to travel between adjacent rotor poles 34 (which are opposite in polarity) through flywheel 20. While pole faces 36 may be mounted to ring 26 in a manner other than the welding shown in the drawings, whatever mounting is used should be such that ring 26 provides a stainless steel barrier between poles 34. Pole faces 36 are axially forwardly offset from collar 32 of rotor 30, so that rotor 30 has somewhat of a bell or cone shape.

Wound around each pole 34 is a field coil 38. The connections of field coils 38 are such that the current will pass in opposite directions through the coil of every other pole 34 thereby creating opposite magnetic poles on the outer radial ends of every other pole 34. This wiring arrangement is conventional in alternator rotors presently known in the art. Mounted on the rearward presented axial face of collar 32 are a pair of concentric slip rings 40, 42. A pair of leads 44, 46 extend from rings 40, 42, respectively, to field coils 38. Frictionally engaging rings 40, 42 are a pair of brushes 48, 50 which are mounted by means of a brush mounting 52 in conventional fashion. Extending from brushes 48, 50 are a pair of leads 54, 56 which extend outwardly from clutch housing 14 and which are connected to electrical circutry to be described hereinafter.

Rigidly mounted between clutch housing 14 and engine 12 is a stator mounting ring 58. Clutch bell housing 14, stator mounting ring 58, and engine 12 are bolted together by means of a plurality of bolts 60. Stator mounting ring 58 includes an inner radial flange 62 which is provided with a circular array of bolt holes.

The numeral 64 generally designates a stator having a substantially circular stator frame 66. Stator frame 66 is bolted to stator mounting ring 58 by means of bolts 68.

Referring to FIG. 3, stator frame 66 is provided with a plurality of slots 70 which extend in a direction parallel to the rotational axis of shafts 16, 18. Slots 70 include a radially inwardly presented opening 72. Wound through slots 70 are a plurality of stator output coils 74 which are wound in conventional fashion for presently known generators or alternators. As seen in FIG. 3, coils 74 are substantially rectangular in shape and lie in a plane which is perpendicular to a radius emanating from rotor 30. Leads 76 (FIG. 2) extend from stator output coils 74 outwardly through bell housing 14.

From the above it can be seen that rotor 30 rotates in unison with flywheel 20, whereas stator 64 is stationary and is rigidly secured to clutch bell housing 14. When flywheel 20 rotates, rotor 30 rotates within stator 64. When electromagnetic lines of force emanate from rotor 30, the rotation of rotor 30 with respect to stator 64 causes electrical current to be generated in the windings of stator 64. The electrical current thus generated is alternating, and the frequency of this alternating current depends upon the rotational velocity of flywheel 20. Therefore a rectifier 77 is connected to output leads 76 so as to change the output current from alternating current to direct current. An inverter 78 is electrically connected to rectifier 77 so as to reconvert the direct current emanating from rectifier 77 into alternating current of a constant frequency regardless of the rotational speed of rotor 30.

In order to insure that the voltage produced by rotor 30 and stator 64 is constant, a voltage regulator 80 is connected in the circuit so as to control field excitation inversely with respect to the rotor speed. Voltage regulator 80 operates in a conventional fashion so that it senses the output voltage and adjusts the field excitation current so as to create a constant voltage output at varying rotor speeds. The higher the speed of the rotor the lower the field current, and the lower the speed of the rotor the higher the field current. Thus the output voltage is constant as a result of the function of voltage regulator 80.

Voltage regulator 80 also provides another important function during the initial operation of the generating device described above. A certain amount of residual magnetism remains within poles 34 of rotor 30. Consequently, when flywheel 20 is rotated, a small amount of current is generated by the rotation of rotor 30 within stator 64. Voltage regulator 80 causes this output voltage to be fed to field coils 38 as excitation current only. The output voltage builds continually until it reaches a predetermined magnitude at which time voltage regulator 80 permits the current to flow on to inverter 78. Thus it can be seen that there is no necessity of initially using battery power or other power to commence the excitation of the field coils 38 of rotor 30.

Also included within clutch housing 14 is a clutch mechanism for transmitting driving force from crankshaft 16 to output shaft 18. The clutch mechanism includes a clutch pedal 82 which rotates about a fulcrum 84, and which includes an actuating finger 86 adapted to rotate in a counterclockwise direction (FIG. 2) in response to depression of pedal 82. Slidably mounted on output shaft 18 is a throw-out bearing 88 which is adapted to slide axially on output shaft 18. Links 90 are pivotally mounted to collar 32 of rotor 30 by means of brackets 92. The inner radial ends of links 90 include fingers 94 which are adapted to engage the forward face of throw-out bearing 88. The opposite ends of links 90 are pivotally connected to a pressure plate 96 by means of brackets 98. Interposed between pressure plate 96 and the rearwardly presented frictional face 22 of flywheel 20 is a friction plate 100 having a high friction surface thereon. Plate 100 includes an inner annular collar 102 which is adapted to slide axially on splines 104 of output shaft 18, but which is held against rotational movement with respect to output shaft 18 by virtue of splines 104.

A plurality of springs 106 yieldably urge pressure plate 96 towards flywheel 20 so that friction plate 22 frictionally engages flywheel 20. Thus normally springs 106 cause friction plate 100 to be driven rotationally by flywheel 20 so that output shaft 18 is normally rotating in unison with flywheel 20 through the engagement of splines 104 of shaft 18 and the inner surface of annular collar 102.

Figure 2:
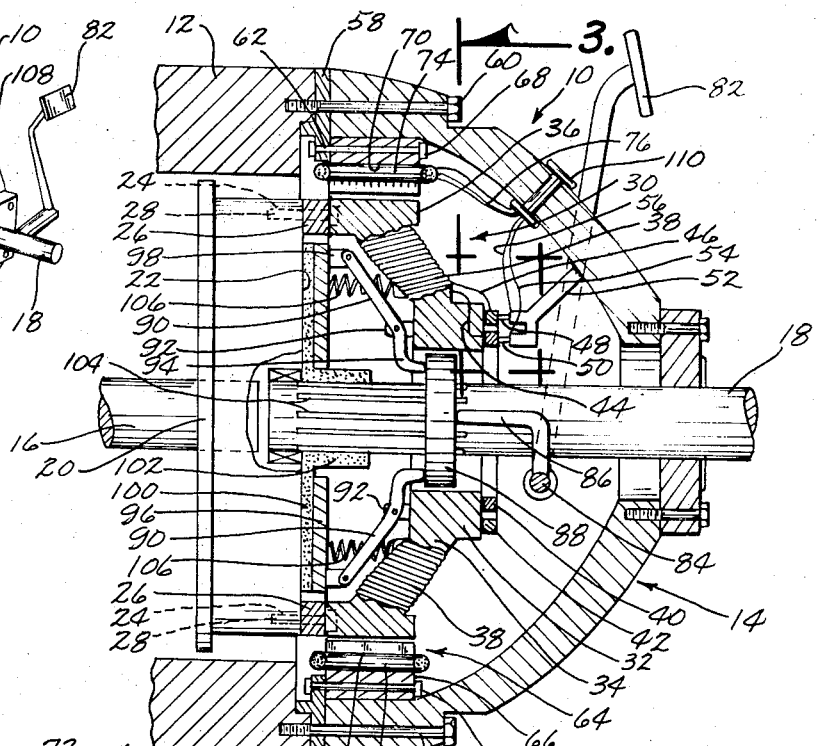
FIG. 2 is a sectional view taken along line 2—2 of FIG. 1.

Upon depression of clutch pedal 82, actuating finger 86 is rotated and moved to the left as shown in FIG. 2, thereby sliding throw-out bearing 88 to the left and pivoting links 90 about brackets 92. This pivoting of links 90 causes pressure plate 96 to be retracted against the bias of springs 106 away from friction plate 100. After pressure plate 96 is retracted, friction plate 100 is permitted to slip with respect to flywheel 20 thereby disengaging the power transmission from shaft 16 to shaft 18.

The present invention combines the function of an alternator rotor and a clutch backing plate so that the rotor also functions as a backing plate. When rotor 30 is bolted to flywheel 20 and stator 64 is installed, electrical current may be generated directly from flywheel 20. Throw-out bearing 88, link 90, and actuating finger 86 extend through annular collar 32 of rotor 30, so that rotor 30 does not hinder in anyway the operation of the clutch mechanism.

The electrical generating device of the present invention may be inserted in conventional clutch housings in the following manner. Clutch bell housing 14 is unbolted from engine 12 and the conventional clutch backing plate is removed. Rotor 30 is bolted to flywheel 20 by means of bolts extending through stainless steel ring 26. Stator 64 is bolted to stator mounting ring 58, and stator mounting ring 58 is interposed between clutch bell housing 14 and motor housing 12. Thus bolts 60 hold stator 64 in place. No modification of the conventional clutch bell housing or mechanism is necessary other than the removal of a backing plate which is commonly bolted to flywheel 20 in conventional devices and replacing the clutch access cover 108 with one containing conduit 110. Thus it can be seen that the device accomplishes at least all of its stated objectives.

I claim:
1. In combination:
   a flywheel;
   a power output shaft having a friction plate thereon;

means for selectively moving said friction plate into and out of frictional engagement with said flywheel whereby said frictional engagement between said friction plate and said flywheel will cause rotation of said flywheel to be transmitted to said output shaft;

a housing surrounding said friction plate;

an electrical current generating device comprising a stator and a rotor, said rotor being secured to said flywheel for rotation therewith, said stator being mounted to said housing and surrounding said rotor in spaced relationship thereto; whereby rotation of said flywheel causes rotation of said rotor within said stator for generating electric current;

said rotor including a central collar, a plurality of poles extending radially outwardly and axially with respect to the rotational axis of said rotor; said poles having outer ends which are rigidly secured to said flywheel; said friction plate being between said flywheel and said central collar of said rotor.

2. The combination of claim 1 wherein a ring-shaped, nonmagnetic barrier means is secured between the outer ends of said poles and said flywheel to prevent magnetic flux from passing from said rotor to said flywheel.

3. The combination of claim 1 wherein said power output shaft extends through said collar of said rotor; said means for moving said friction plate including mechanism extending through said collar and engaging said friction plate for moving said friction plate.

4. The combination of claim 3 wherein said mechanism includes a throw-out bearing slidably mounted on said output shaft, an actuating finger for engaging said bearing and sliding said bearing on said output shaft, and a linkage engaging said throw-out bearing and adapted to move said friction plate in response to sliding movement of said throw-out bearing on said output shaft.

5. The combination of claim 4 wherein spring means yieldably hold said friction plate in frictional engagement with said flywheel, said linkage being adapted to remove said spring bias from said friction plate in response to sliding movement of said throw-out bearing whereby said friction plate is released from frictional engagement with said flywheel.

* * * * *